United States Patent Office 3,245,168
Patented Apr. 12, 1966

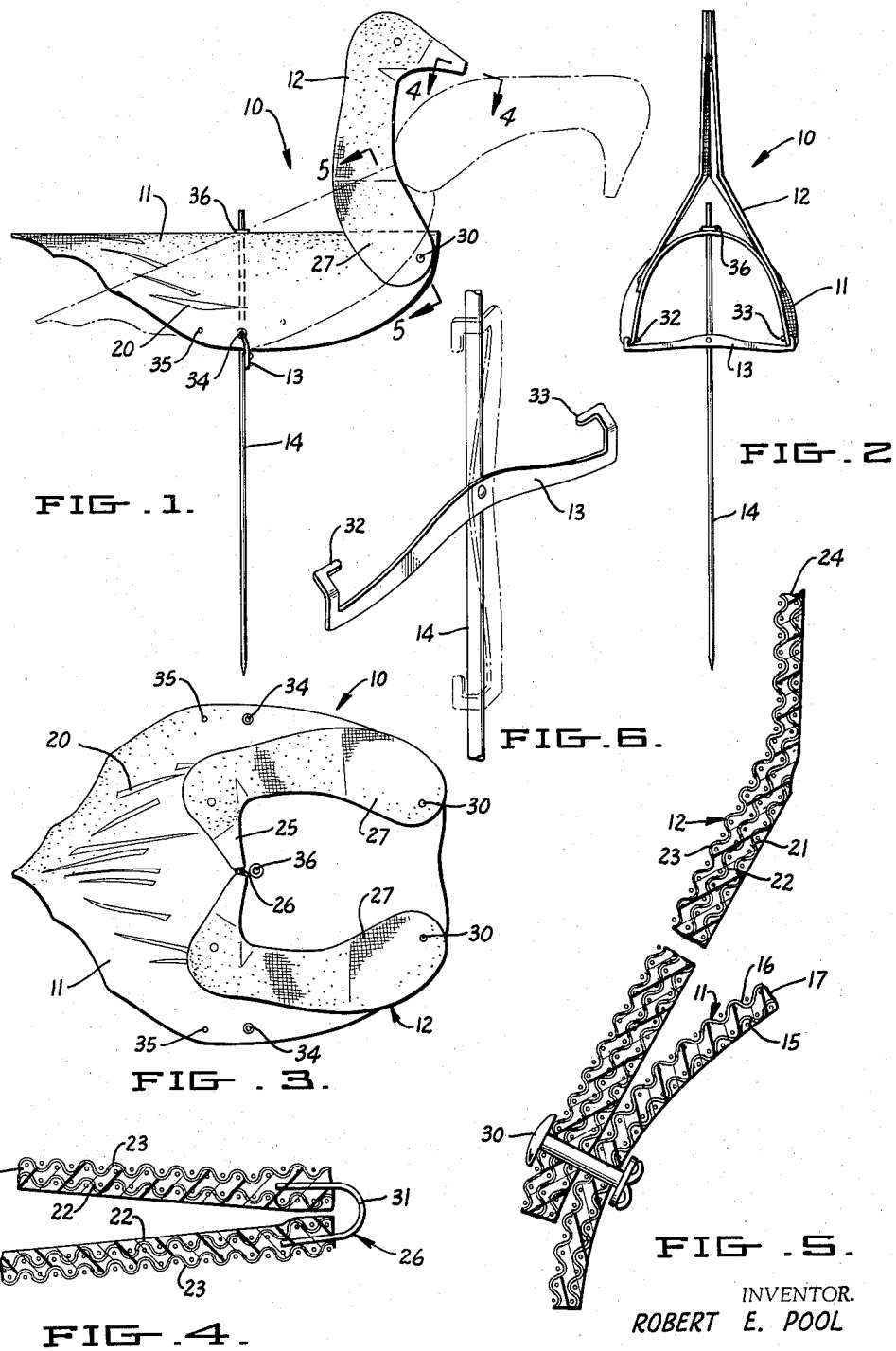

3,245,168
FOLDABLE GOOSE DECOY
Robert E. Pool, 2524 Old Sonoma Road, Napa, Calif.
Filed June 24, 1964, Ser. No. 377,608
6 Claims. (Cl. 43—3)

This invention relates to a foldable bird decoy and is more particularly directed to such a decoy which simulates a goose in appearance and is adapted to be folded from the flat position to an extended position having the shape of a goose.

In the prior art various forms of knock-down type goose decoys have been provided. These decoys can be divided into two general classes, namely: those having pre-set parts adapted to be disassembled when not in use and, those formed of hinged sections adapted to be folded into flat condition when not in use. Knockdown decoys of the pre-set type have the disadvantage that the parts thereof are relatively expensive to fabricate and difficult to store, even when disassembled. Decoys comprised of foldable hinged sections have a disadvantage that the contours thereof do not closely simulate those of a bird. Specifically, when folded into extended condition, the latter type of decoy defines an object having angular edges and flat surfaces.

It is, accordingly, a principal object of this invention to provide a knock-down type of foldable decoy overcoming the disadvantages of prior art devices of this type.

Another and more specific object of the invention is to provide a foldable decoy which has rounded contours when extended which closely simulate those of an actual bird.

A further specific object of this invention is to provide a foldable goose decoy having a neck and head section which appears three dimensional and is adjustable between feed and watch positions.

Yet another and related object of the invention is to provide a goose decoy with a body section which is adjustable in attitude between feed and watch positions.

Still another object of the invention is to provide a knock-down type of decoy which is durable in construction and relatively inexpensive to fabricate.

In its broadest aspect, the decoy of the present invention comprises a flexible flat body section adapted to be bent into a substantially semi-cylindrical configuration simulating the back and sides of a bird by pulling a pair of the opposed edges thereof towards each other. The decoy also includes a bracket adapted to engage said opposed edges to maintain the body section in said configuration and a support to mount the body section in upright position. The basic decoy structure is completed by a head and neck section secured to the body section adjacent one end thereof between said opposed edges.

The foregoing and other objects of the invention in the detailed structure of the decoy will become more apparent when viewed in light of the accompanying drawings wherein:

FIG. 1 is a side elevational view of the decoy in erected condition, showing the watch and feed positions thereof in solid and phantom lines, respectively;

FIG. 2 is a front elevational view of the decoy in erected condition;

FIG. 3 is a top plan view of the decoy in knocked-down or folded condition;

FIGS. 4 and 5 are enlarged cross sectional views taken on lines 4—4 and 5—5 of FIG. 1, respectively; and FIG. 6 is a perspective view showing the interrelationship of the holding bracket and mounting support rod in open and folded conditions.

Referring now to the drawings in detail, the numeral 10 therein designates the decoy in its entirely. The decoy basically comprises: a body section 11; a head and neck section 12 pivotally secured to the forward end of the body section; a bracket 13 adapted to maintain the body section in the condition illustrated in FIGS. 1 and 2; and a rod 14 adapted to support the body section in the erect condition.

The body section 11, as illustrated in detail in FIG. 5, is fabricated of laminated layers of burlap 15 and 16 held together by a resin 17. The resin 17 should be water resistant and capable of holding the burlap layers together while at the same time providing some degree of resiliency to the laminated burlap layers once set up. The resiliency of the burlap layers, as will become apparent subsequently, provides for the bending of the body section into a substantially semi-cylindrical configuration. A preferable resin has been found to be polyester, although other resins, such as certain varnishes, with the required characteristics of water resistance and resiliency are also suitable.

Ideally, the resin 17 is applied to form a laminar layer between the burlap layers 15 and 16 and to impregnate the layer 15 while only adhering to the layer 16. Impregnation of the layer 16 by the resin is avoided to assure that the exterior surface presented thereby has a matted characteristic simulating the feathers of a bird. The exterior surface of the layer 16 is painted to be water resistant and closely simulate the color of a bird. Particular attention is directed to FIGS. 1 and 3 wherein dart like lines 20 are shown painted on the layer 16 to simulate tail feathers.

The head and neck section 12, as illustrated in FIGS. 4 and 5, is similar to the body section 11 in that it is fabricated of laminated layers of burlap 21 to 23 held together by resin 24 corresponding to the previously described resin 17. It is noted that the lower portions of the head and neck section secured to the body section are laminated of three layers of burlap so as to be relatively rigid, whereas the upper portions of the head and neck section are only laminated of two layers of burlap. Ideally, the resin 24 forms a laminar layer between the respective layers of burlap and impregnates the inner layers of burlap while only adhering to the outer layer of burlap. The outer layer of burlap, as illustrated in FIGS. 1 and 3, is painted to be water resistant and closely simulate the head and neck of a bird in appearance.

From FIG. 3 it can be seen that the head and neck section 12 comprises a substantially flat U-shaped member adapted to be juxtaposed to the body section 11 when the latter is in flat condition. The U-shaped member is defined by a base 25 having a hinge 26 intermediate the ends thereof and a pair of identical legs 27 extending away from the base to hinge connections 30 with the forward end of the body section 11. The hinge 26, as viewed in FIG. 4, merely comprises a flexible cord 31 interposed in the base and secured thereto between the burlap layers 22 and 23 by the resin 24.

In use, the decoy 10 is erected from the flat condition illustrated in FIG. 3 to the erect condition illustrated in FIGS. 1 and 2 by pulling the undersides of the opposed side edges of the body section 11 towards each other and pivoting the head and neck section 12 forward about the hinge connections 30. Due to the resilient character of the body section 11, so pulling the opposed side portions thereof toward each other functions to bend the body section into a substantially semi-cylindrical configuration closely simulating the back of a goose. With the body section 11 erected, the head and neck section assumes a substantially three dimensional appearance upon being pulled forward about the hinges 30. This appearance is facilitated by the relatively rigid lower ends of the head and neck section which force the upper more flexible portions thereof towards each other. As illustrated by the solid and phantom lines in FIG. 1, the head and neck section 12 may be pivoted to a degree and selectively held in an attitude either simulating a watch or a feed position, respectively, by friction between the legs and body section.

Reference is now made to the aforementioned bracket 13 and support rod 14 which are adapted to maintain and support the decoy 10 in the erect condition illustrated in FIGS. 1 and 2. The bracket 13 comprises an essentially yoke shaped member having inwardly bent hooks 32 and 33 at the ends thereof which are adapted to simultaneously engage alternative pairs of eyelets 34 and 35 in the opposed side edges of the body section 11. The rod 14 is pivotally secured intermediate the ends thereof to the bracket 13 and is provided with an upper end adapted to pass through an eyelet 36 in the body section 11 and a lower end adapted to be pushed into the earth. It is noted that the pivotal connection between the rod 14 and bracket 13 facilitates movement of the bracket between an extended position substantially normal to the rod and a retracted position in alignment with the rod, as illustrated in solid and phantom lines, respectively, in FIG. 6. To maintain the bracket 13 in aligned relationship with respect to the rod 14, the hooked ends 32 and 33 are bent towards the rod so as to resiliently engage the rod when aligned therewith. At this point it is noted that both the bracket 13 and rod 14 are fabricated of a corrosion resistant resilient metal, such as aluminum or brass.

To attach the bracket 13 and rod 14 to the body section 11 it is merely necessary to pass the rod 14 through the eyelet 36 and simultaneously engage the hooks 32 and 33 in either the eyelets 34 or 35. By selecting the eyelets into which the hooks 32 and 33 are passed, the attitude of the body section 11 with respect to the rod 14 may be maintained in either of the positions illustrated by solid and phantom lines in FIG. 1. It is to be understood that this attitude could also be changed by maintaining the hooks 32 in a single pair of eyelets in the body section and providing alternative eyelets through which the rod 14 could pass.

To conclude, from the foregoing detailed description it is believed apparent that the present invention enables the accomplishment of the objects initially set forth herein. In particular, an improved foldable decoy is provided which may be readily erected or knocked down and closely simulates the contours of a bird when erected. It is to be understood, however, that the invention is not intended to be limited to the specific embodiment illustrated and described, but rather is defined by the following claims.

What is claimed is:
1. A foldable decoy, comprising:
(A) a flexible flat body section adapted to be bent into a substantially semi-cylindrical configuration simulating the back and sides of a bird by pulling a pair of opposed edges thereof towards each other;
(B) means adapted to engage said opposed edges to maintain said body section in said configuration;
(C) a support operatively associated with said body section to mount said section in an upright position when in said configuration;
(D) a head and neck section comprising a substantially U-shaped flexible flat member defined by a base and a pair of legs, said base being foldable to permit said legs to swing towards each other;
(E) hinge connections securing the respective free ends of said legs to one end of said body section at portions thereof which assume a substantially opposed relationship when said body section is bent into said semi-cylindrical configuration; and wherein:
 (1) the head and neck section is pivotal about said hinge connections, when said body section is in said semi-cylindrical configuration, between a flat condition juxtaposed to the body section and a folded condition extending laterally from the body section; and,
 (2) said head and neck section assumes a three-dimensional configuration when in the folded condition extending laterally from the body section.

2. A decoy according to claim 1, wherein:
(A) said means comprises a rigid bracket having ends adapted to engage said opposed edges; and
(B) said support comprises a rod secured intermediate the ends thereof to said bracket, said rod having one end adapted to engage said body section and the other end adapted to be pushed into the earth.

3. A decoy according to claim 2 including means to vary the relative positions at which the bracket and rod engage said body section to change the attitude of said section with respect to said rod.

4. A decoy according to claim 1, wherein said hinge connections provide suitable swinging and friction between said legs and body section whereby when in said folded condition extending laterally from the body section the head and neck section may be selectively set in positions simulating feeding and watching.

5. A decoy according to claim 1, wherein:
(A) the body section and neck and head section are fabricated of laminated burlap held together with resilient waterproof resin; and,
(B) the outer surfaces of said sections are substantially free of said resin and colored to simulate the markings of a bird.

6. A decoy according to claim 1, wherein:
(A) the free ends of said legs secured to said body section are substantially rigid relative to the remainder of said head and neck section; and,
(B) the free ends of said legs secured to said body section function to force said legs toward each other upon pivoting of said head and neck section to the folded condition extending laterally from said body section.

References Cited by the Examiner
UNITED STATES PATENTS

| | | | |
|---|---|---|---|
| 1,603,114 | 10/1926 | Johnson | 43—3 |
| 2,011,480 | 8/1935 | Gazalski | 43—3 |
| 2,478,585 | 8/1949 | Kouba | 43—3 |

FOREIGN PATENTS

| | | |
|---|---|---|
| 621,277 | 4/1949 | Great Britain. |

SAMUEL KOREN, *Primary Examiner.*
ABRAHAM G. STONE, *Examiner.*